US005664332A

United States Patent [19]

Whited et al.

[11] Patent Number: 5,664,332

[45] Date of Patent: Sep. 9, 1997

[54] HAND KNIFE WITH COVER

[75] Inventors: Jeffrey A. Whited, Amherst; Robert L. Leimbach, Wakeman, both of Ohio

[73] Assignee: Bettcher Industries, Inc., Birmingham, Ohio

[21] Appl. No.: 601,093

[22] Filed: Feb. 14, 1996

[51] Int. Cl.$^{6}$ .......... A22C 17/04; B26B 23/00

[52] U.S. Cl. .......... 30/276

[58] Field of Search .......... 30/276, 124, 347, 30/142, 285

[56] References Cited

U.S. PATENT DOCUMENTS

| | | | |
|---|---|---|---|
| 3,269,010 | 8/1966 | Bettcher | 30/276 |
| 3,461,557 | 8/1969 | Behring | 30/276 |
| 3,688,403 | 9/1972 | Bettccher | 30/276 |
| 4,175,321 | 11/1979 | Bettcher | 30/276 |
| 4,439,924 | 4/1984 | Bettcher | 30/276 |
| 4,516,323 | 5/1985 | Bettcher et al. | 30/276 |
| 4,575,937 | 3/1986 | McCullough | 30/276 |
| 5,230,154 | 7/1993 | Decker et al. | 30/276 |
| 5,522,142 | 6/1996 | Whited | 30/276 |
| 5,529,532 | 6/1996 | Desrosiers | 30/276 X |

*Primary Examiner*—Douglas D. Watts

*Attorney, Agent, or Firm*—Watts, Hoffmann, Fisher & Heinke Co., L.P.A.

[57] ABSTRACT

A hand held slicing knife comprises a handle assembly, a ring-like blade housing carried by the handle assembly and having a central axis and first and second opposite axial sides, a ring blade supported by the housing about the axis and projecting from the first axial blade housing side, a blade drive transmission for rotating the blade about the axis, a gage member disposed radially inwardly from the ring blade and supported for adjustable axial movement relative to the blade to control the thickness of material cut by the knife, and a cut material directing cover comprising a base wall spaced from the second axial blade housing side and a side wall projecting from the base wall in the general direction of extent of the axis, the side wall disposed radially outwardly of the blade housing and extending axially from the base wall at least to a location radially adjacent the second blade housing side.

7 Claims, 4 Drawing Sheets

HAND KNIFE WITH COVER

FIELD OF THE INVENTION

The present invention relates to hand knives and more particularly to power driven hand knives used to cut materials likely to splatter after cutting.

BACKGROUND

Use of power operated hand knives for slicing comestible materials, such as meat, has become relatively commonplace in meat packing facilities and food service environments. Such knives offer advantages in ease of use, speed and, at least in food service settings, improved portion control. Knives of the sort referred to may find other uses, but for present purposes the knives will be referred to in the context of the food service industry.

An example of power operated slicing knife usage is in preparing so-called "gyros" sandwiches, equivalent sandwiches using meat known as schwarma, donner kebabs, or kebabs, and other related dishes. A large frustoconical body of frozen meat is mounted, base end up, on a vertical spit and rotated about a vertical axis adjacent a broiler extending the height of the meat cone. A relatively thin meat cone surface layer is both defrosted and broiled as it rotates slowly past the broiler. An attendant at a work station adjacent the spit slices the broiled layer from the meat cone with a hand knife.

The meat cone may be constructed in one of three ways. The meat may be finely comminuted, combined with a suitable filler, and pressed into the frustoconical shape under great pressure so that a monolithic meat body is produced. Alternatively, a composite meat body may be formed by stacking single muscle rounds with alternating layers of fat and herbs and pressing the assemblage onto the spit. A third form of meat cone is a composite assembled from single muscle rounds interleaved with pressed comminuted meat rounds pressed onto the spit.

THE PRIOR ART

Traditionally, the meat cones were sliced with long flexible carving knives. Skilled carvers were required, the work was difficult and portion control suffered because slice thicknesses were not uniform. The power operated slicing knife disclosed in U.S. patent application Ser. No. 08/268,973, filed Jun. 30, 1994, improved the situation by providing uniformly thin slices and greatly easing the effort required to slice the cone. The knife disclosed in the application incorporated a rotating ring blade and a slice thickness gage for controlling the cut depth. Liquified fat propelled by the knife blade was deflected away from the knife handle and the operator's hand where it might otherwise have interfered with knife handling.

The power knife referred to was particularly effective when slicing monolithic meat cones because essentially continuous strips of sliced meat were produced. These meat strips dropped from the knife to a platter or a work station surface adjacent the meat cone. When used to slice meat from composite cones, chip-like slices of meat and/or liquified fat tended to be propelled away from the knife by the rotating blade. Although the meat pieces and fat were deflected from the knife handle and the attendant's hand, their trajectories were unpredictable and splattering around and beyond the work station could occur.

The present invention provides a new and improved hand knife which is so constructed and arranged that uniformly thin slices are cut by a rotating ring blade while small chip-like pieces and liquid, which might otherwise be thrown off by the blade and create undesirable splattering, are contained and directed from the knife to the work station.

SUMMARY OF THE INVENTION

The present invention provides a hand knife for cutting relatively thin slices. The knife comprises a handle assembly, a ring-like blade housing carried by and projecting from the handle assembly, a ring blade, a blade drive transmission and a sliced material directing cover. The blade housing is disposed about a central axis and has first and second opposite axial sides. The ring blade is supported by the housing about the axis with the blade projecting from the first axial blade housing side. The drive transmission rotates the blade about the axis for slicing. The cover comprises a base wall spaced from the second axial blade housing side and a side wall projecting from the base wall in the general direction of extent of the axis. The side wall is disposed radially outwardly of the blade housing and extends axially from the base wall at least to a location radially adjacent the second blade housing side.

The preferred and illustrated hand knife further comprises a gage member disposed radially inwardly from the ring blade and supported for adjustable axial movement relative to the blade to control the thickness of material cut by the knife.

Further features and advantages of the invention will become apparent from the following detailed description of a preferred embodiment made with reference to the accompanying drawings.

DESCRIPTION OF THE BEST KNOWN MODE FOR PRACTICING THE INVENTION

Figure 1:
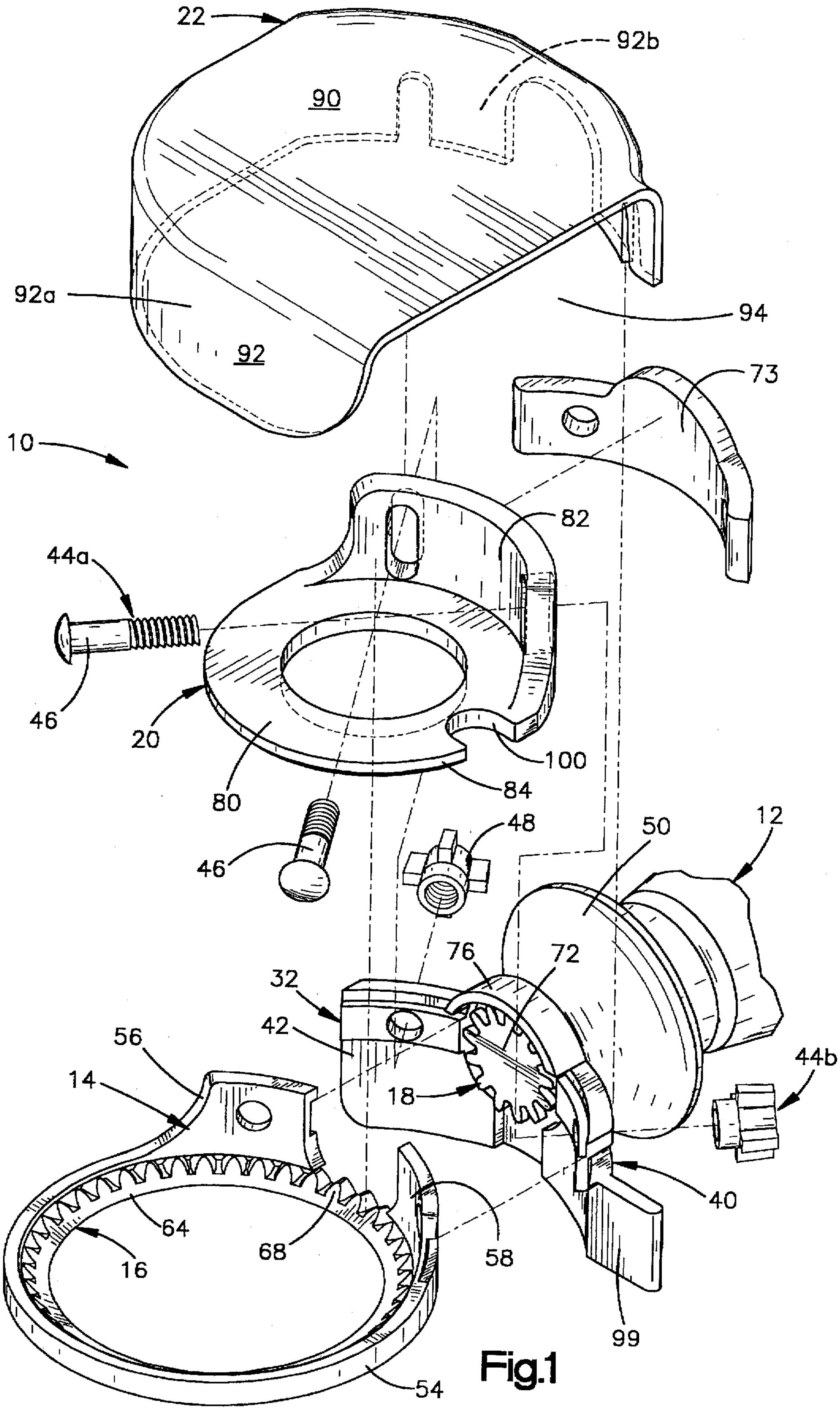
FIG. 1 is an exploded perspective view of a hand knife constructed according to the invention with portions broken away.

A hand knife 10 embodying the invention is illustrated in the drawings. The knife 10 is particularly adapted for slicing meat used in "gyros" sandwiches, or the like. A frustoconical body of meat is assembled by stacking single muscle rounds with alternating layers of fat and herbs and pressing the assemblage onto a vertical spit located at a work station. The spit rotates about a vertical axis in front of a vertically extending broiler. The meat surface is broiled as it passes the broiler and then the surface layer is sliced off by an attendant using the knife 10. The knife 10 is power driven and delivers chip-like slices of meat to a platter or a work surface from which it is gathered for serving.

The knife 10 comprises an elongated handle assembly 12, a ring-like blade housing 14 carried by and projecting from the handle assembly, a rotatable ring blade 16, a blade drive transmission 18, a slicing gage 20 and a sliced-meat-directing cover 22. The attendant holds the knife 10 with the longitudinal handle assembly axis 23 (FIGS. 2 and 3)

oriented generally horizontally and moves the knife vertically up and down in sweeping motions along the meat cone face. The blade 16 rotates to slice a thin layer of broiled material off the meat cone. Chips, or fragments, of sliced meat and liquid fat, which would otherwise be propelled radially outwardly from the rotating blade, are contained and directed vertically downwardly from the knife to the work surface by the cover 22.

Figure 2:
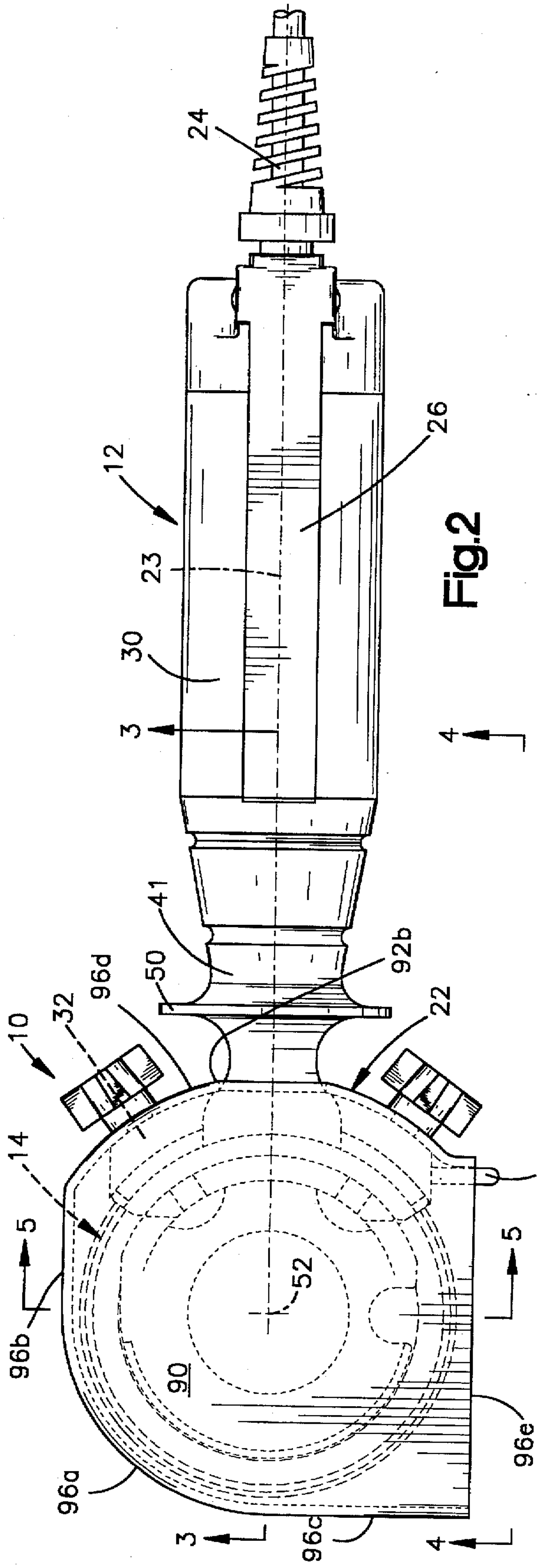
FIG. 2 is a top plan view of the knife illustrated in FIG. 1.
Figure 3:
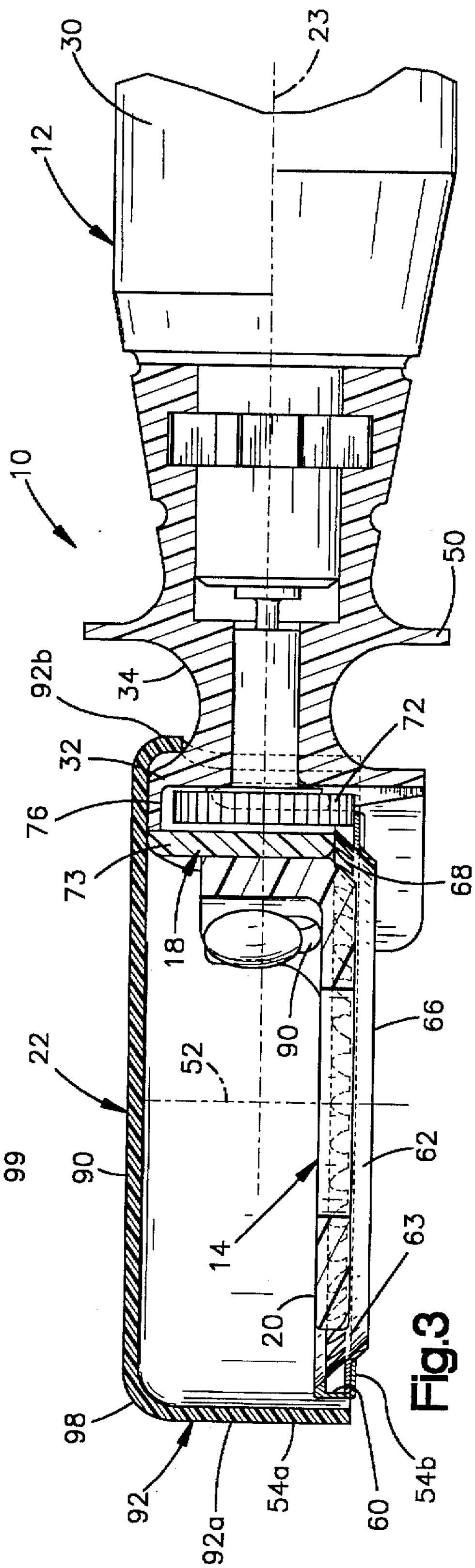
FIG. 3 is an enlarged fragmentary view seen approximately from the plane indicated by the line 3—3 of FIG. 2.
Figure 4:
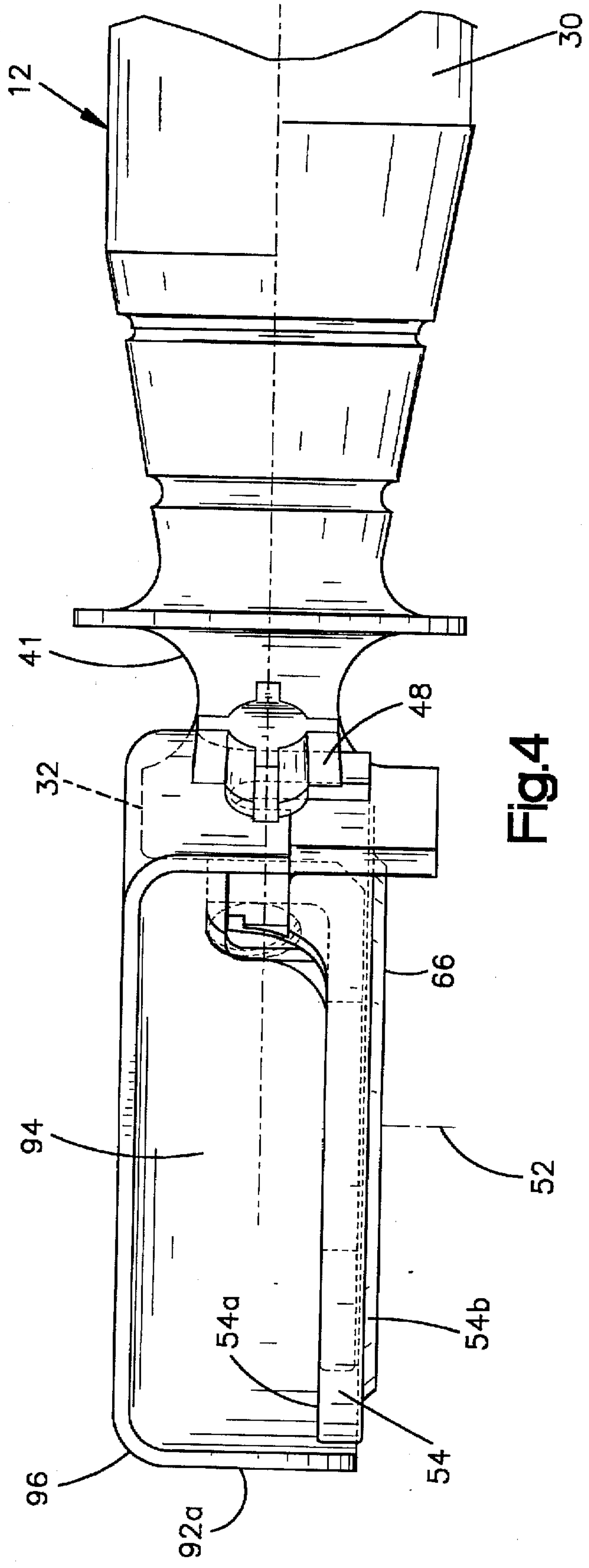
FIG. 4 is an elevational view of part of the knife of FIG. 2 seen approximately from the plane indicated by the line 4—4 of FIG. 2; and, FIG. 5 is an enlarged cross sectional view seen approximately from the plane indicated by the line 5—5 of FIG. 2.

The illustrated knife is operated by an electric motor (not illustrated) housed in the handle assembly 12 and connected to a suitable power supply via a power line 24 (FIG. 2). The attendant turns on the knife motor by actuating an on-off switch (not shown). In the illustrated knife the attendant depresses a "dead man" switch operating lever 26 while grasping the handle assembly. When the attendant releases the handle assembly the lever 26 springs away from the handle assembly turning off the knife motor. While an electric motor driven knife is illustrated, it should be appreciated that other kinds of drives may be employed, for example, a remote electric motor with flexible drive shaft extending to the knife or a handle mounted air motor with pressurized air supplied through a flexible hose.

The handle assembly 12 houses the blade drive transmission 18, serves as a support for the remaining knife components and provides a comfortable hand piece for the attendant. The preferred handle assembly 12 comprises a manually grippable handle 30 and a head piece 32 for securing the blade housing, blade and associated gage and cover to the handle assembly.

The illustrated handle 30 is an elongated element shaped so that it can be manually gripped for manipulating the knife over an extended period of time with the knife operator experiencing minimum discomfort or fatigue. In the illustrated knife the handle 30 is generally cylindrical, tubular and projects from the head piece 32 along the longitudinal axis 23. The blade driving motor is mounted in the tubular handle 30 and the power line is fixed to the handle end.

The head piece 32 anchors the blade housing 14 and blade 16, the guide 20 and the cover 22 to the handle assembly. The illustrated head piece comprises a blade housing seating assembly 40 and an integral shank 41 extending from the seating assembly to the handle. The assembly 40 comprises a semicircular blade housing seat element 42 and connectors 44*a*, 44*b* for securing the blade housing, guide and cover to the seat element 42. Each illustrated connector is formed by a clamp 44 comprising a screw 46 and a wing nut 48. The screw 46 extends radially outwardly through aligned openings in the gage 20, blade housing 14, seat element 42 and cover 22. The wing nut 48 is threaded onto the projecting screw and clamps the gage, blade housing, seat element and cover firmly together between the screw head and the wing nut.

The preferred shank 41 extends between the handle 30 and the seating assembly 40 and defines a generally frustoconical, tubular handle section converging toward the head piece. A flange-like finger guard 50 projects outwardly from the shank near the head piece for preventing an attendant's hand from sliding onto the blade during use.

The illustrated knife 10 employs a handle assembly in which the head piece is continuous and molded from a high strength, light weight plastic, such as polysulfone, having a formulation suited for use with food products. The handle 30 is detachably connected to the shank 41 and formed by a light weight, nonreactive material, such as molded sulfone plastic or a light metal casting.

Figure 5:
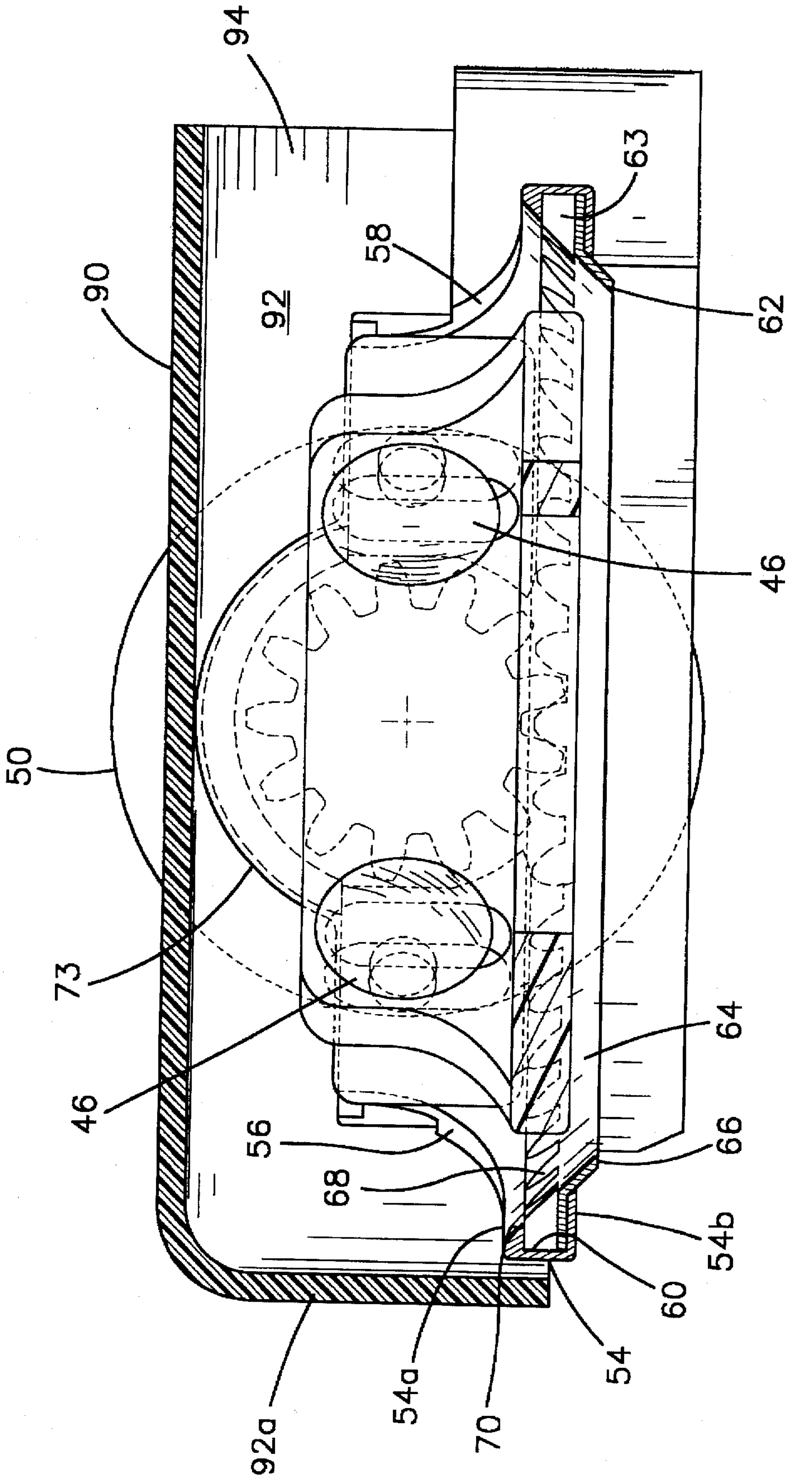

The blade housing 14 is disposed about a central axis 52 and comprises a thin circularly curved blade support 54 (FIG. 1) projecting away from the handle assembly 12 in a plane normal to the axis 52. The preferred and illustrated housing 14 is configured as a split ring with enlarged end sections 56, 58 each clamped against the seat element 42. As best seen in FIGS. 1, 3 and 5, the blade support 54 has opposite axial sides 54*a*, 54*b*, and defines a radially inwardly facing groove 60 extending continuously about the blade support 54 and through the end sections 56, 58. The groove 60 slidably receives the ring blade 16 which projects radially inwardly and axially away from the axial blade support side 54*b*. The groove 60 is relatively large compared to the cross sectional area of the blade support 54 so the remaining blade support wall forms a thin radially inwardly opening "U" shape. The radially inwardly extending legs of the "U" support the blade ring against movement in the direction of the axis 52.

The end sections 56, 58 are formed by flange-like axial extensions of the blade support 54. Each section defines a through hole receiving a respective clamping screw 46. Each end section defines a radially outwardly facing locating groove that mates with a conforming land on the seat element 42. The lands and grooves facilitate positioning the blade housing for being clamped in place on the seat element.

The ring blade 16 may be removed from the blade housing for periodic cleaning or replacement by removing the damp screws 46 and separating the blade housing 14 from the handle assemlby. The housing end sections 56, 58 are then spread apart slightly. This resiliently expands the blade support diameter so the ring blade may be removed from the groove 60.

The blade 16 is driven about the axis 52 relative to the supporting housing 14 as the knife moves back and forth across the face of the meat cone. The blade 16 in the illustrated knife comprises a thin frustoconical blade element 62 and a radially outer, enlarged blade section 63. The blade element 62 projects radially inwardly from the groove 60 and converges proceeding away from the gage 20 and cover 22. The blade cutting edge is formed by the intersection of the radially inner, conical blade wall surface 64 and an end face 66 disposed in a plane normal to the axis 52 (See FIG. 5).

The radially outer, enlarged blade section 63 is slidably disposed in the groove 60 and forms a ring gear with gear teeth 68 projecting axially parallel to the axis 52. The gear teeth are disposed within the groove 60 except for a short span where the ring gear extends between the housing end sections 56, 58. The conical inner blade wall surface 64 extends from the blade cutting edge through the tips of the axial gear teeth 68. The blade support groove wall adjacent the projecting gear teeth ends terminates in a frustoconical face 70 aligned with the blade wall surface 64. The surface 64 and groove wall face 70 present a smooth path across which meat passes after being cut.

The blade drive transmission 18 drives the ring blade about the axis 52 relative to the blade support. In the illustrated knife 10 the drive transmission 18 comprises a spur gear 72 journalled in the handle assembly 12 with its teeth in mesh with the blade teeth 68, and a gear cover 73. The gear 72 is directly driven from the electric motor output shaft in the handle.

The gear 72 is disposed in a chamber formed between the blade housing end sections 56, 58, a gear shrouding flange 76 molded into the seat element 42, and the gear cover 73. Each blade housing end section 56, 58 defines an arcuately curved end face providing clearance for the gear 72. The flange 76 is contiguous the section end faces and forms a continuation of the curved clearance space formed between the end sections.

The gear cover 73 is clamped in place over the gear 72 to secure the gear in place. The gear 73 bridges the blade housing end sections 56, 58 and is circularly curved about the axis 52. The preferred gear cover has an arcuate central part and opposite ends extending along respective housing end sections. The central part overlies and engages the shrouding flange 76. The gear cover ends define through holes alignable with the holes in the end sections 56, 58 for receiving the screws 46. The illustrated cover 73 is a molded plastic part like the head piece 32.

The slicing gage 20 extends parallel to the blade edge to establish the thickness of slices produced by the knife. In the illustrated knife the gage 20 comprises a flat, thin annular body 80 disposed within the ring blade periphery and an axially extending cylindrically curved support flange 82 clamped to the handle assemlby 12. The outer body periphery 84 is generally circular and extends parallel to the blade. The body periphery closest to the blade edge is chamfered to facilitate passage of sliced meat through the space between the blade and the body 80.

The slicing gage comprises position-adjusting structure enabling gage repositioning to adjust slice thickness as desired. The illustrated position adjusting structure comprises axial slots 90 defined in the support flange 82 through which the clamp screws 46 extend. The screw heads engage and clamp the flange 82 anywhere along the slot margins depending on where the gage is positioned relative to the blade housing 16.

The cover 22 extends over and about the blade housing 16 for containing material sliced by the knife blade and directing the material to a platter or work surface below the knife. The cover comprises a base wall 90 spaced from the second axial blade housing side, a side wall 92 projecting from the cover base wall in the general direction of extent of the axis 52 and a discharge opening 94 for directing material from within the cover downwardly from the typical knife location to a work surface or platter. The preferred cover is formed from a continuous plastic body, such as polysulfone.

The base wall 90 is positioned so that meat fragments and liquid fat which would otherwise be hurled axially from the rotating knife blade impinge on the cover and pass through the discharge opening. The base wall 90 is preferably a flat imperforate member spaced axially away from the blade support axial side 54a. The illustrated base wall is spaced from the blade support 54 a minimum distance about equal to the blade driving spur gear diameter (approximately 2.5 cm). This spacing assures that elongated pieces of sliced meat do not become jammed in the cover 22 during a fast downward knife stroke. The knife 10 therefore is readily usable to slice meat from a monolithic meat cone without the need to remove or adjust the cover 22 or the gage 20.

The base wall periphery 96 comprises a portion 96a that is generally radially aligned with the outer diameter of the blade support 54 remote from the seat element 42. The base wall peripheral portion 96a thus forms a semicircular section. Short tangential opposite end sections 96b, 96c extend from opposite ends of the portion 96a. A base wall peripheral section 96d adjacent the handle assembly 12 is semicircular and extends radially away from the axis 52 beyond the seat element 42 and defines a semicircular section 96d. The base wall peripheral section 96e extends straight between the sections 96b and 96d to form a side of the discharge opening 94.

The side wall 92 both supports the cover in position on the knife and deflects material that would otherwise be thrown radially away from the knife and splattered about the work station. The illustrated side wall 92 extends flange-like from the base wall 90 parallel to the axis 52 toward the blade support and the seat element. A smoothly curved radiused wall section 98 joins the side and base walls.

A side wall section 92a functions to deflect cut materials toward the discharge opening. The side wall section 92a depends from the base wall periphery sections 96a–c and extends, skirt-like, closely about the blade support outer periphery through about 180° from the discharge opening 94 to the seat element 42. Cut material emerging from the space between the gage and the blade support impinges on the wall section 92a and is constrained to pass from the cover through the discharge opening. The edge of the side wall section 92a forms one side of the discharge opening 94.

A side wall section 92b is detachably secured to the seat element 42 for rigidly supporting the cover in place with respect to the blade support. The illustrated section 92b is continuous with the side wall section 92a and is clamped in place against the element 42 by the wing nuts 48. Slots are formed in the wall section 92b for receiving the screws 46 while permitting cover position adjustment before the wing nuts are tightened. A separate shank-receiving slot assures clearance between the cover and shank 41 while extending closely about the seat element 42. The end of the wall section 92b forms one side of the discharge opening 94.

The knife 10 is shown as comprising a liquified fat deflecting tab 99 projecting from one end of the blade housing seat element 42. The tab 99 is aligned with the end of the wall section 92b and extends from the element 42 to a location just beyond the plane of the discharge opening 94 in alignment with the end of the wall section 92b. The tab 99 extends substantially beyond the blade support side 54b in the direction of the axis 52 to assure that liquified fat on the seat element 42 is shed from the knife and precluded from running onto the shank 41 and handle 30.

In the illustrated knife 10 the cover 22 and gage 20 are constructed to facilitate periodic blade steeling without removing or adjusting the cover or the gage. The slicing gage 20 defines a radial slot 100 opening in the outer periphery of the gage body 80. The slot 100 is aligned with the center of the base wall peripheral section 96e at the center of the discharge opening 94. A sharpening steel inserted through the slot 100 and bearing against the base wall section 96e engages the blade 18 at an appropriate steeling angle. The knife is operated to rotate the blade with the sharpening steel in position.

The illustrated knife 10 is constructed and arranged for use by a fight handed attendant. The cover discharge opening 94 opens downwardly when the handle assembly 12 is held in the attendant's right hand, generally horizontally and swept up and down along the meat cone. The material cut from the meat cone thus falls from the opening 94 in a direction generally tranverse to both axes 23 and 52, and onto a platter or work surface below the meat cone.

Knives for left handed attendants are supplied with covers having discharge openings oriented oppositely from the illustrated cover. Such knives have fat deflecting tabs coextending with the oppositely oriented discharge openings and have slicing gage steeling slots formed diametrically opposite to that described.

While a single embodiment of the invention has been illustrated and described in considerable detail, the present invention is not to be considered limited to the precise construction disclosed. Various adaptations, modifications and uses of the invention may occur to those skilled in the arts to which the invention relates. It is the intention to cover all such adaptations, modifications and uses falling within the scope or spirit of the annexed claims.

Having described my invention I claim:

1. A hand held slicing knife comprising:

a handle assembly;

a ring-like blade housing carried by and projecting from said handle assembly, said housing disposed about a central axis and having first and second opposite axial sides;

a ring blade supported by said housing about said axis, said blade projecting from said first axial blade housing side;

a blade drive transmission for rotating said blade about said axis; and, a cut material directing cover comprising a base wall spaced from said second axial blade housing side and a side wall projecting from said base wall in the general direction of extent of said axis, said side wall disposed radially outwardly of said blade housing and extending axially from said base wall at least to a location radially adjacent said second blade housing side.

2. The hand knife claimed in claim 1 further comprising a gage member disposed radially inwardly from said ring blade and supported for adjustable axial movement relative to said blade to control the thickness of material cut by said knife.

3. The hand knife claimed in claim 2 wherein said gage member is spaced axially from said base wall so that cut material may pass between said gage member and base wall.

4. The hand knife claimed in claim 1 wherein said base wall and said side wall define a discharge opening for directing cut material from said knife.

5. The hand knife claimed in claim 1 further comprising a connector for securing said cover in position with respect to said blade and blade housing.

6. The hand knife claimed in claim 5 further comprising a gage member disposed radially inwardly from said ring blade and supported for adjustable axial movement relative to said blade to control the thickness of material cut by said knife.

7. The hand knife claimed in claim 5 further wherein said connector comprises a damp for securing said gage in position with respect to said blade and blade housing, said damp coacting with position adjusting structure formed on said gage to enable repositioning said gage axially relative to said blade housing.

* * * * *